United States Patent [19]

Clad

[11] 4,275,672
[45] Jun. 30, 1981

[54] DIBBER

[76] Inventor: L. Susan Clad, 419 Starmount La., Bakersfield, Calif. 93309

[21] Appl. No.: 48,094

[22] Filed: Jun. 13, 1979

[51] Int. Cl.³ .............................................. A01C 5/00
[52] U.S. Cl. ..................................... 111/99; 33/169 B
[58] Field of Search ....................... 111/89, 90, 91, 92, 111/93, 94, 95, 96, 97, 98, 99; 47/39, 82, 83, 67, 1 A; 172/371, 372, 430; 29/8; 7/114, 116, 163, 164; 30/368, 164.7, 151; 33/189, 174 R, 174 E, 169 R, 169 B, 178 R, 1 H, 293; 145/78

[56] References Cited

U.S. PATENT DOCUMENTS

| 323,419 | 8/1885 | Hiller | 111/99 |
| 1,900,827 | 3/1933 | Love | 111/99 |
| 3,908,308 | 9/1975 | Meyers | 47/56 |

FOREIGN PATENT DOCUMENTS

| 477031 | 9/1951 | Canada | 33/174 E |
| 679550 | 7/1939 | Fed. Rep. of Germany | 111/99 |
| 2730279 | 1/1979 | Fed. Rep. of Germany | 47/82 |
| 952341 | 11/1949 | France | 111/7.1 |
| 20696 | of 1909 | United Kingdom | 111/99 |

Primary Examiner—James R. Feyrer
Attorney, Agent, or Firm—Erik M. Arnhem

[57] ABSTRACT

A dibber, having a handle portion, and integral therewith an implementing portion tapering to a point, variably apertured collared disks, mountable, upwardly slidable to measured points on the implementing portion, indicating the ideal depths for planting various kinds of seeds in the soil.

1 Claim, 6 Drawing Figures

DIBBER

BACKGROUND OF THE INVENTION

My invention relates primarily, to a gardening implement, called dibber or dibble. Its main function is to make holes in the ground for the planting of seeds or seedlings. However, the dibber, according to the invention also constitutes an excellent means for hand weeding.

In order to attain optimum results from sowing and growing, e.g., garden vegetables or fruits, it is recognized, that the seeds of the latter be divided into certain groups, for planting at different depth levels in the ground.

SUMMARY OF THE INVENTION

As noted above, my invention refers to an implement, that is perfectly shaped for its purpose, namely to make holes in the soil for planting of seeds therein, for use as a weeding tool and in replanting, e.g., seedlings when they grow too crowded.

The inventor has reproduced a chart in the following for four distinct groups of vegetables and fruit seeds, which—with a view to obtaining the choicest produce—should be planted at specific depth levels in the soil.

Instead of calibrating the invented implement itself (which certainly is of little value, when the dibber is soiled or worn), the inventor has conceived a number of disks, provided with centered holes of variable diameters, which—according to the diameter of a particular hole in the disk—may be slit upwardly to a certain point on the tapering dibber and no further. For example, the ideal planting depth for pumpkins is one inch. Consequently, if one wishes to plant pumpkin seeds, one would only use the disk that can be slit one inch upwardly on the dibber.

When the implement, according to the invention, is used to make a hole no deeper than one inch in the soil, the one-inch-disk is applied, as described, and the ideal depth level is automatically established for the placing of pumpkin seeds in the soil.

Thus, it is the object of the invention to provide a multi-purpose gardening implement.

It is a further object of the invention to provide the implement with attachable and detachable accurate and easily viewable soil level indicating means.

DESCRIPTION OF THE PREFERRED EMBODIMENTS

Figure 1:
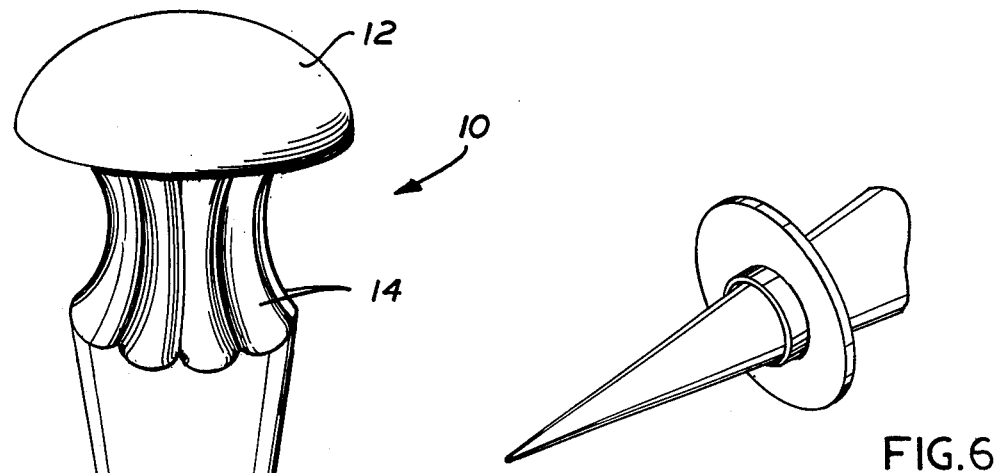
FIG. 1 is a perspective view of the implement, according to the invention, with a soil depth indicating disk mounted thereon.
Figure 6:
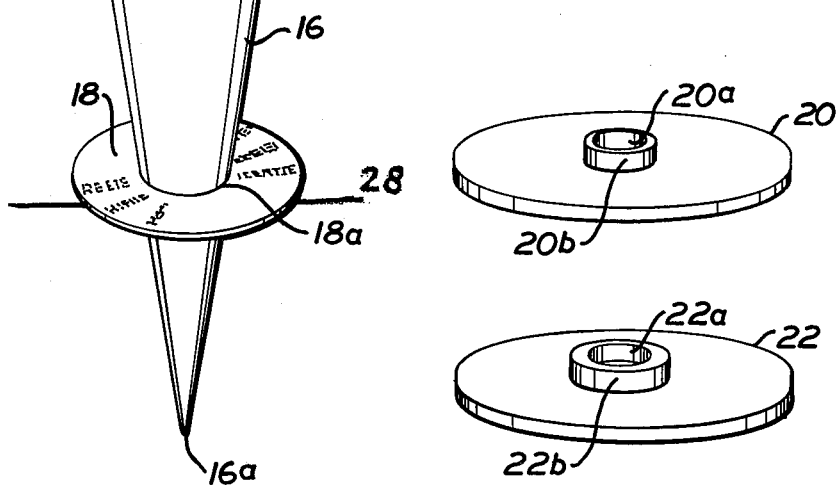
FIG. 6 is another perspective view of the implement with a soil depth indicating device mounted thereon.
Figure 2:
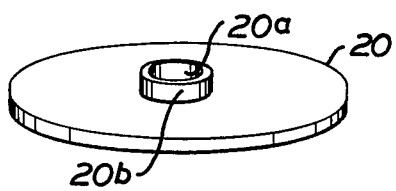
FIGS. 2, 3 and 4 are perspective views of variably apertured indicator disks.
Figure 3:
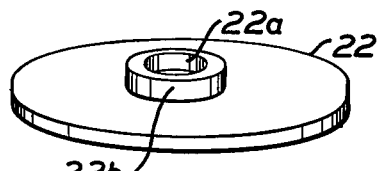

In the drawings like reference characters designate similar parts in the several views.

Referring now in detail to the drawings, numeral 10 designates the gardening implement in its entirety, according to the invention.

The upper part of the implement 10 has a dome-shaped top 12, onto which the palm of one's hand may apply downward pressure in order to make a sufficiently deep hole in the soil. The portion of implement 10, immediately following top 12 comprises a depressed grooved section 14, and constitutes a grip or handle for the hand, e.g., when weeding, removing soil around young plants for replanting, etc.

The portion of implement 10 extending from grip 14, constitutes a tapering section 16, terminating in a point 16a, with which the actual piercing and removal of soil, weeds, etc., is carried out.

FIGS. 2, 3, 4 and 5 illustrate disks 20, 22, 24, and 26 having centered apertures 20a, 22a, 24a, and 26a of varying diameters. The variable sized apertures of the disks are so dimensioned, that they respectively can be slit upwardly on tapering portion 16 of implement 10, only to points measuring $\frac{1}{4}$, $\frac{1}{2}$, 1 and $1\frac{1}{2}$ inches, respectively from the terminal point of implement 10.

Figure 4:
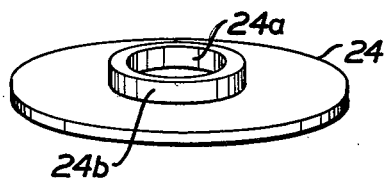

Thus, as stated above, if one desires to plant pumpkin seeds, disk of FIG. 4 should be mounted on implement 10, as an indicator of a one inch distance from implement point 16a to the underside of disk 24, being the depth of the hole to be made for pumpkin seeds. Once the implement 10 has been pierced in the soil to the depth level of one inch, disk 24 is incapable, due to the diameter of its particularly dimensioned aperture 24a, of being pressed further upwardly, and thus will prevent implement 10 from penetrating deeper than one inch into the soil. This is illustrated in FIG. 1, where disk 18—after penetration of the implement—rests on soil surface 28, and implement portion 16 of dibber 10 is prevented from penetrating deeper into the soil, due to the restricting diameter of aperture 18a.

Figure 5:
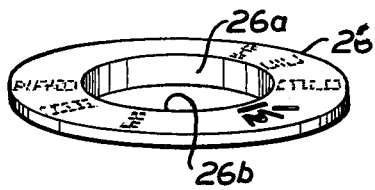
FIG. 5 is an indicator disk for the implement, ideal as a depth indicator for the vegetables listed thereon.

The disk in FIG. 5, is provided with a legend, printed or engraved thereon, indicating the depth level ($1\frac{1}{2}$ inch) and the vegetables or fruits for which the use of disk 26 is ideal.

One could also prepare a list of vegetables and fruits, as the one presented hereinafter, which indicates the respective disks (20, 22, 24 and 26) usable for obtaining a proper depth level in the soil.

The disks 20, 22, 24 and 26 are, respectively provided with collars 20b, 22b, 24b and 26b which surround apertures 20a, 22a, 24a, 26a, respectively and extend downwardly therefrom, when mounted on the implement. Once one of the disks is mounted on tapering portion 16 of implement 10, its collar will contribute to stabilizing and maintaining the horizontal position of the disk on the implement.

The inventor found that the ideal total length of the implement is about 8 inches.

The following lists of vegetables and fruits are divided into four classifications, namely for planting at $\frac{1}{4}$, $\frac{1}{2}$, 1 and $1\frac{1}{2}$ inch depths, which appear to be the ideal ones for the so classified produce.

| $\frac{1}{4}$ inch Soil Depth | $\frac{1}{2}$ inch Soil Depth |
| --- | --- |
| Peppers | Radishes |
| Onions | Cabbage |
| Celery | Onion |
| Tomatoes | Lettuce |
| Eggplant | Chives |
| Most Flowers | Collards |
| Parsley | Kale |
| | Cress |
| | Leek |
| | Beets |

-continued

| | |
|---|---|
| | Turnips |
| | Endive |
| | Carrots |
| | Rutabagas |
| | Cauliflower |
| | Leeks |
| | Mustard |
| | Kohlerabs |
| | Broccoli |
| | Parsnips |
| | Brussel Sprouts |
| 1 inch | 1½ inch |
| Soil Depth | Soil Depth |
| Chard | Beans, Snap |
| Spinach | Beans, Lima |
| Pumpkin | Garlic cloves |
| Okra | Corn |
| Squash | Watermelon |
| Cantalope | Peas |

While the foregoing has illustrated and described what is now contemplated to be the best mode of carrying out the invention, the above embodiments of my invention are, of course, subject to modifications without departing from the spirit and scope of the invention.

Therefore, it is not desired to restrict the invention to the particular constructions illustrated and described but to cover all modifications, that may fall within the scope of the appended claims.

I claim:

1. In a manually depth adjustable dibber implement, comprising:
   (a) a dibber, having a rounded top extending into a narrowing grooved gripping section, said gripping section also being grooved, and a section, extending integrally therefrom, tapering to a point;
   (b) a plurality of disks, respectively, having centered apertures of varied diameters, slidably detachable at varied height levels on the dibber, the disks having, respectively, a collar, surrounding and extending from the respective apertures of the disks, stabilizing their positions when slidably attached on the dibber.

* * * * *